US008065173B2

(12) United States Patent
Abu-Hakima et al.

(10) Patent No.: US 8,065,173 B2
(45) Date of Patent: Nov. 22, 2011

(54) COLLABORATIVE MULTI-AGENT SYSTEM FOR DYNAMIC MANAGEMENT OF ELECTRONIC SERVICES IN A MOBILE GLOBAL NETWORK ENVIRONMENT

(76) Inventors: Suhayya Abu-Hakima, Kanata (CA); Kenneth E. Grigg, Kanata (CA)

(*) Notice: Subject to any disclaimer, the term of this patent is extended or adjusted under 35 U.S.C. 154(b) by 1058 days.

(21) Appl. No.: 11/926,451

(22) Filed: Oct. 29, 2007

(65) Prior Publication Data

US 2009/0112608 A1    Apr. 30, 2009

(51) Int. Cl.
G06Q 10/00    (2006.01)
(52) U.S. Cl. ............. 705/7.11; 705/348; 705/14.13; 705/14.41; 705/32; 235/376; 702/176; 702/177; 702/178; 702/179; 702/180; 702/181; 702/182; 702/183; 702/184; 702/185; 702/186; 702/187; 702/188; 703/2; 703/3; 703/4; 703/5; 703/6
(58) Field of Classification Search ............... 705/7
See application file for complete search history.

(56) References Cited

U.S. PATENT DOCUMENTS

| | | |
|---|---|---|
| 6,192,354 B1 | 2/2001 | Bigus et al. |
| 6,263,358 B1* | 7/2001 | Lee et al. ............ 718/100 |
| 6,401,080 B1 | 6/2002 | Bigus et al. |
| 6,427,063 B1 | 7/2002 | Cook et al. |
| 6,513,059 B1 | 1/2003 | Gupta et al. |
| 7,073,129 B1 | 7/2006 | Robarts et al. |
| 7,103,580 B1 | 9/2006 | Batachia et al. |
| 2002/0064149 A1 | 5/2002 | Elliot et al. |
| 2004/0205034 A1* | 10/2004 | Bigus et al. ............ 706/10 |
| 2005/0141706 A1 | 6/2005 | Regli et al. |
| 2006/0072505 A1 | 4/2006 | Carrillo et al. |
| 2006/0090013 A1 | 4/2006 | Achacoco et al. |
| 2006/0146731 A1 | 7/2006 | Lewis et al. |
| 2006/0173959 A1* | 8/2006 | McKelvie et al. ............ 709/204 |
| 2007/0171881 A1* | 7/2007 | Zhang et al. ............ 370/338 |

FOREIGN PATENT DOCUMENTS

| | | | |
|---|---|---|---|
| CA | 2222594 | * | 5/1996 |
| EP | 1 686 441 | | 8/2006 |

OTHER PUBLICATIONS

Melville et al. Content-Boosted Collaborative Filtering for Improved Recommendations (Proceedings of the Eighteenth National Conference on Artificial Intelligence(AAAI-2002), pp. 187-192, Edmonton, Canada, Jul. 2002).* Sofus A. MacSkassy, Aynur A. Dayanik, Haym Hirsh, Information Valets for Intelligent Information Access, in AAAI 2000 Spring Symposium on Adaptive User Interfaces.
Prem Melville, Raymond J. Mooney, and Ramadass Nagarajan, Content-Boosted Collaborative Filtering for Improved Recommendations. Proceedings of the Eighteenth National Conference on Artificial Intelligence (AAAI-2002), pp. 187-192, Edmonton, Alberta, Canada, Jul. 2002, (University of Texas at Austin).

* cited by examiner

*Primary Examiner* — James A Reagan
(74) *Attorney, Agent, or Firm* — Oppedahl Patent Law Firm LLC (57) ABSTRACT

A computer-readable electronic services management system for a mobile communications network, comprising a distributed network of agents in the form of collaborative autonomous software agents wherein the agents are configured to represent and act on behalf of a user and to communicate with each other to manage, for the user, one or more electronic services (e.g. electronic messages, a purchase etc.) via the user's communications devices. Multiple types of agents include a primary personal agent, a primary creation agent for creating other agents and subordinate agents, and a primary destruction agent for destroying agents meeting pre-determined criteria based on a threshold value in relation to an agent value coefficient. Collaboration between agents is by a private user whiteboard facility whereby collaborating agents post to the whiteboard addressed electronic services, including service tasks to be performed for the user, and extract from the whiteboard electronic services addressed to them.

19 Claims, 7 Drawing Sheets

COLLABORATIVE MULTI-AGENT SYSTEM FOR DYNAMIC MANAGEMENT OF ELECTRONIC SERVICES IN A MOBILE GLOBAL NETWORK ENVIRONMENT

FIELD OF THE INVENTION

The invention pertains to the field of electronic services management in a mobile networked environment and, more particularly, to a system for dynamic, management of electronic services including information exchange, messages and/or requests received by and/or forwarded to and/or generated by one or more communications devices or intelligent agents on behalf of a system user (i.e. a human user) or their intelligent agents, using a collaborative, distributed multi-agent network.

BACKGROUND

Today's fast converging web, email, VoIP, chat, video, blog and wiki technologies require dynamic, fast, intelligent analysis and delivery of services and relevant content to mobile end user devices whose bandwidth, storage, processing and capacity is not that of fully loaded typical desktops. Moreover, consumers are increasingly using SMS (short message service)-enabled mobile phones and constrained by the small micro displays (e.g. 2 in. by 2 in.) of these devices which, typically, are formatted to display only up to 120 to 160 ASCII characters, or 1 SMS packet, or 12 to 16 words, at any one time since more words would need more SMS packets.

Furthermore, end users are increasingly seeking contextually intelligent applications that bring relevant information to them, as they need it. The convergence of resources on the Internet and World Wide Web is also resulting in the digitization of more information than ever. Moreover, a convergence of communications and content modes, has resulted in a need in the marketplace for improved systems to allow end users and their intelligent agents to request Internet services and transactions, and/or receive and/or respond to the content of communications directed to them, on a seemingly real-time basis and via whatever in-context mode is best suited to do so, whether it be user or autonomous agent communication by voice, email, chat, video or some other mode. As such, there is a growing need for means to provide assistance to such mobile and desktop device users to manage this myriad of services including transactions, information and content, that is continuously being directed to, and generated by them.

SUMMARY

In accordance with invention a computer-readable electronic services management system for a mobile communications network is provided. The system comprises a distributed network of agents in the form of collaborative autonomous software agents. The agents are configured to represent and act on behalf of a user wherein they communicate with each other to manage for the user one or more electronic services comprising one or more of electronic messages, services and/or requests received by and/or forwarded to and/or generated by one or more communications devices of the user. The agents comprise multiple types of agents comprising at least one primary personal agent, a primary creation agent configured for creating other agents including one or more subordinate agents, and a primary destruction agent configured for destroying an agent meeting pre-determined criteria comprising a threshold value in relation to an agent value coefficient. The agents are configured for collaboration together using a private user whiteboard facility whereby collaborating agents post addressed electronic services, including service tasks to be performed for said user, to the whiteboard and extract electronic services from the whiteboard which are addressed to them, to share content and information, to request and/or receive services from the other agents and to deliver services to the other agents and/or to the user.

The creation agents preferably endow to each type of agent knowledge specific that type of agent and processes for that type of agent to perform, to learn, and/or to make valuation decisions. Discovery agents may also be provided, wherein they are configured for monitoring the user's actions for service level usage, for reviewing third party information useful for identifying new needs and/or interests of the user and for determining a prospective new service for the user, wherein the prospective new service is presented to the user as one or more prospective new service agents once a predetermined threshold level for a relevancy value attributed to the prospective new service agent(s) is reached based on relevancy factors to the user.

The system preferable further includes a primary professional agent and each of the personal and professional agents preferably comprises an agent value facility for determining the agent value coefficient whereby a value calculation process is performed to assign to that agent a numeric value based on the importance of that agent in completing a task, the value coefficient being increased with each such task the agent is called upon to complete. The primary personal agent is an intelligent agent which may act as a central controller for the user, collaborating with the other agents and components of the system. The primary professional agent is also an intelligent agent and may act cooperatively with the primary personal agent as the central controller, collaborating with the other agents and components of the system. Preferably, the system further comprises a plurality of specialist, subordinate agents configured to perform specialized tasks and/or functions for the user.

A primary identity agent, with one or more subordinate identity agents, are preferably configured to share identity information personal to the user wherein the identity information is distributed over a plurality of the identity agents whereby no single identity agent holds all of the user's identity information. The destruction agents monitors the identity agents for activities indicating corruption and/or violating terms of contracts between the identify agents and other the agents. Each identity agent is created by a creation agent which maintains security information pertaining to the identity agent, including the identity agent's required processes and/or the identity agent's rights and/or the identity agent's encryption keys. A primary police agent with one or more subordinate police agents, being subordinate to the destruction agents, are preferably provided to monitor agents' activities performed using the private whiteboard and report any process step taken by one or more agents which is not permitted by the agent(s) or is otherwise non-conforming with pre-determined permitted processes of the agent(s).

The network of agents preferably includes one or more mobile agents configured to protect the user's personal identity information while the mobile agent is in transit using encryption. The system is configured to apply two distinct agent security layers to an agent seeking to access and/or use personal identity information, including verifying the agent's right to access and/or use the personal identity information and verifying the personal identity information's source's right to make such access and/or use available to the agent. A bidding component is provided for agents' use in acting on behalf of the user to obtain a competitive service result. It is configured for use by the agents for collaborating through the private whiteboard to obtain competing service results, to provide the competing service results to the user for the user's selection and to accept on behalf of the user a user-selected service result.

Each agent operates collaboratively with other agents in providing a service for the user, and the agent value coefficient may be further based on that agent's contribution to the collaborative agent network. The system may also include specialized subordinate professional agents having expertise in, and configured for providing user services pertaining to, specialized professional interests of the user. The personal and professional agents may be configured to compete to provide services to the user, with the agent value facility also configured to cause the agent value coefficient to represent the agent's relative performance measured against other agents.

Each agent has a sensing engine configured to accept and analyse electronic services input to the system, a reasoning engine configured to receive the input services from the sensing engine and combine the input services with knowledge obtained from other input services and/or knowledge obtained from a knowledge base of rules and facts, a learning engine configured to compare the input services to existing knowledge in the knowledge base and to add the input services to the knowledge base if it is not already contained in the knowledge base, and a communication engine configured to output electronic services from the agent and input electronic services to the agent.

Inter-agent collaboration comprises communication and negotiation between agents, and is performed directly with the primary personal and professional agents and indirectly for the primary personal and professional agents by subordinate agents with which the primary personal and professional agents communicate and negotiate. The system may also comprise a user/agent feedback facility configured for providing feedback to the system in respect of services provided by an agent to the user or to another the agent acting for the user, the user/agent feedback represented by positive and/or negative values applied in relation to the value coefficient of the agent which provided the services. The agents are preferably further configured to collaborate to learn how to decide what is relevant to the user, whereby a relevancy value is calculated and associated with an item of electronic information being processed by the system based on content and/or the personal or professional context of the user. The user/agent feedback facility is configured to perform feedback analysis for an agent assigned a user/agent feedback value, to determine the nature and/or cause of such feedback value and to identify and implement a change that may be made by that agent in performing a valuated service to improve that agent's service to the user/agent.

DESCRIPTION OF THE DRAWINGS

The present invention is described in detail below with reference to the following drawings in which like reference numerals refer throughout to like elements and arrows between block components indicate a direction of data flow. It is to be noted that in FIGS. 3-6 the dashed lines and solid lines are intended to have the same meaning (the dashed lines being used to avoid clutter in the drawings), namely, to show channels of communication or monitoring between components or modules.

DETAILED DESCRIPTION OF A PREFERRED EMBODIMENT

The electronic services management system is comprised of a distributed network of collaborative, autonomous software agents for a mobile network including the Internet and World Wide Web. For simplicity, reference is sometimes made in the following description to "agents", but it is to be understood that such references are intended to refer to software agents as better described in the following description. Further, the term "electronic service" herein means any electronic transaction, exchange or event of any type involving communicated electronic data and most typically in the embodiment described hereinafter includes information exchange, messages and/or requests received by and/or forwarded to and/or generated by one or more communications devices or intelligent agents on behalf of a system user.

Figure 1:
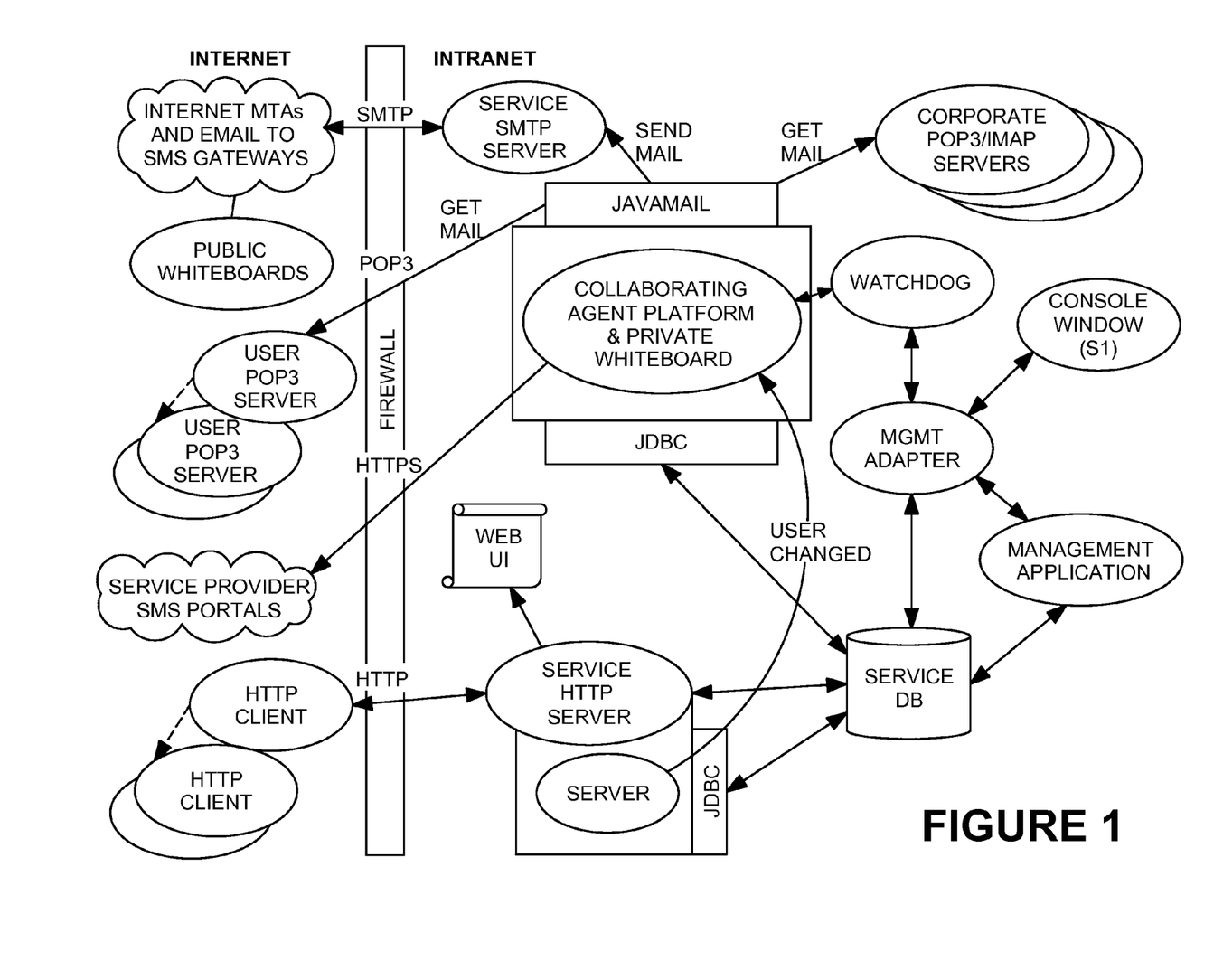
FIG. 1 is a high level block diagram providing an overview of a mobile network architecture in which a system according to the invention may be incorporated, wherein the software components shown by dark shaded ovals may be provided as part of the system and those shown by unshaded ovals may be provided as third party/off-the-shelf software components. The architecture may run in a Java Virtual Machine (JVM) or distributed JVMs.

FIG. 1 illustrates an overview of some of the components of an Internet and mobile network utilizing the information management system.

Figure 2:
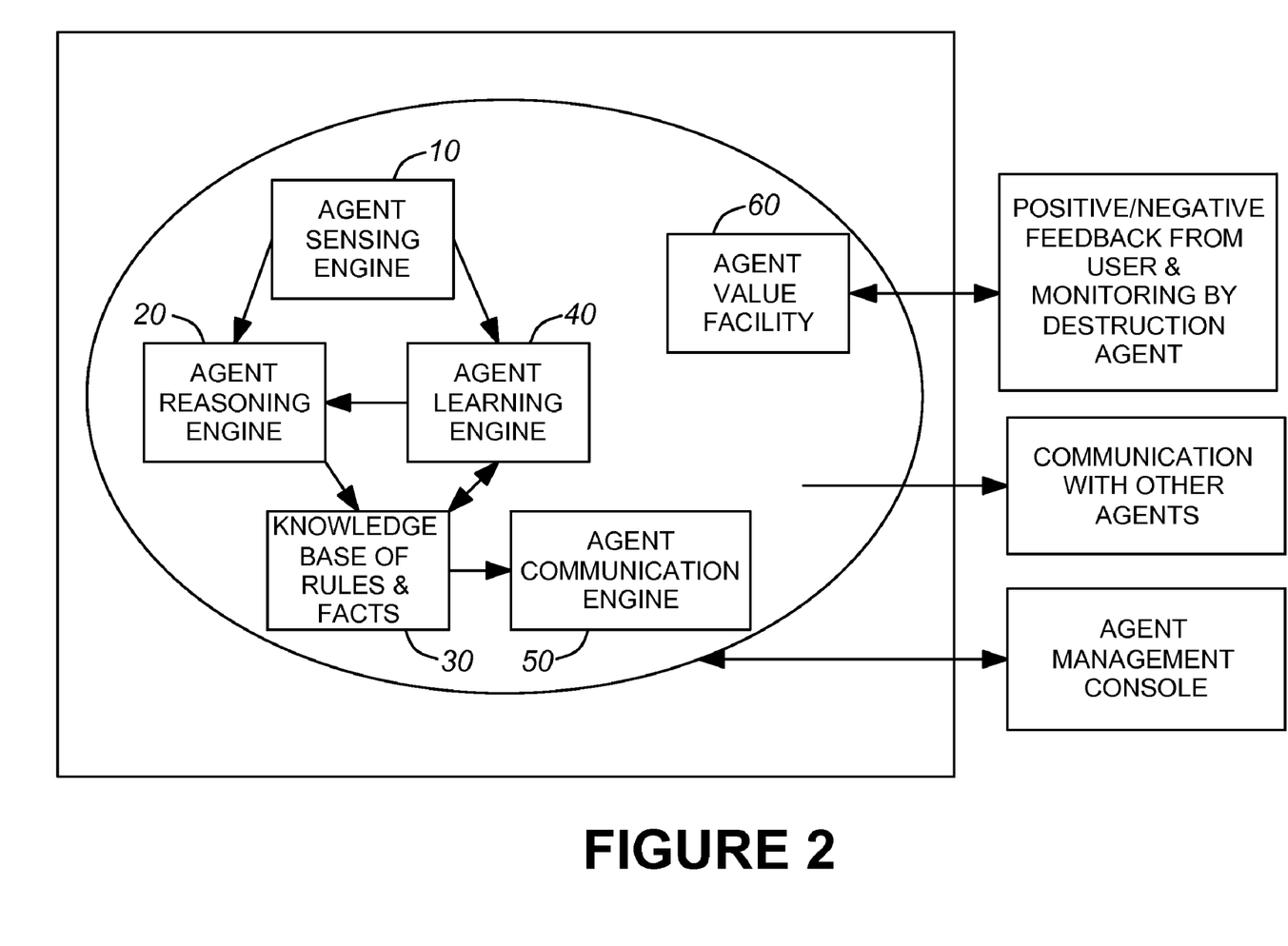
FIG. 2 is a high level block diagram illustrating a generic autonomous software agent structure used by a system in accordance with the invention. In completing tasks assigned to them, agents provide information and/or are used to execute transactions, or to obtain delivery of goods and services for the user and/or other agents.

The present embodiment of the invention utilizes the structure of agents shown in FIG. 2. Each autonomous agent has a sensing engine 10 that accepts and analyses electronic information from other agents or whiteboards input to the system (hereinafter alternatively referred to as "input"). This input can be a request from another agent or information in the form of text, voice, video or other form of electronic information. The agent sensing engine 10 delivers the input to a reasoning engine 20 which combines that input with knowledge obtained from other input information and/or knowledge obtained from a knowledge base 30 of rules and facts. A learning engine 40 takes new input from the sensing engine 10 and compares it to existing knowledge in the knowledge base 30; if knowledge taken from the new input is not already contained in the knowledge base 30 it is added to it and, thus, is learned by the system, whereby the knowledge so learned can include facts and/or rules taken or interpreted from the input. A communication engine 50 handles communications output from and input to the agent.

Figure 3:
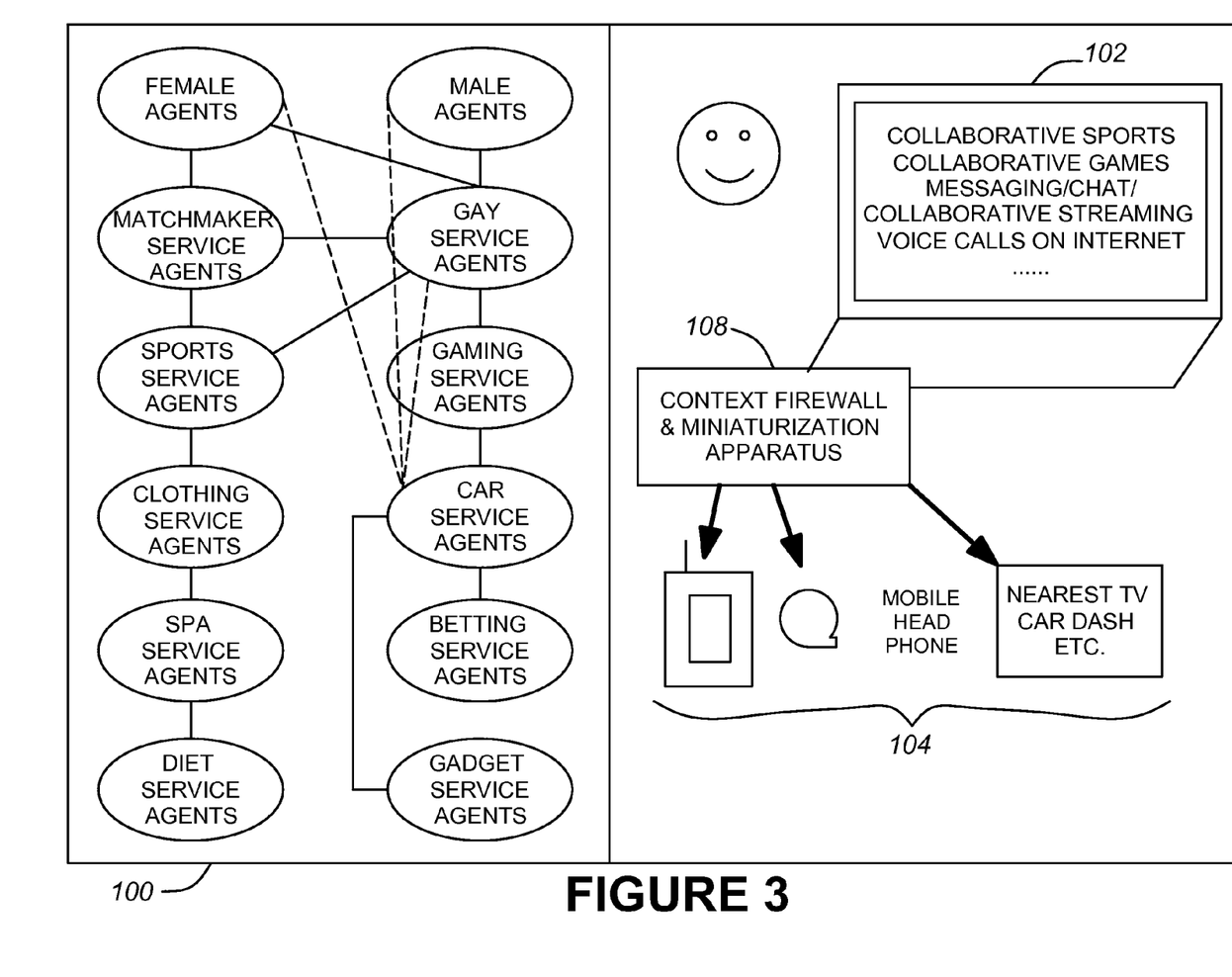
FIG. 3 is a schematic diagram illustrating on the left-hand-side an exemplary network of personal software agents, showing exemplary patterns of information (i.e. data) flow and services transactions, on the right-hand-side, an exemplary user environment for that network of personal service software agents including examples of collaborative services and the devices that such information is delivered on (e.g. the nearest television, car dash, etc.), wherein the left-hand-side illustration is a logical representation of a possible multi-agent definition and the right-hand-side illustration represents a physical embodiment of that logical representation.
Figure 4:
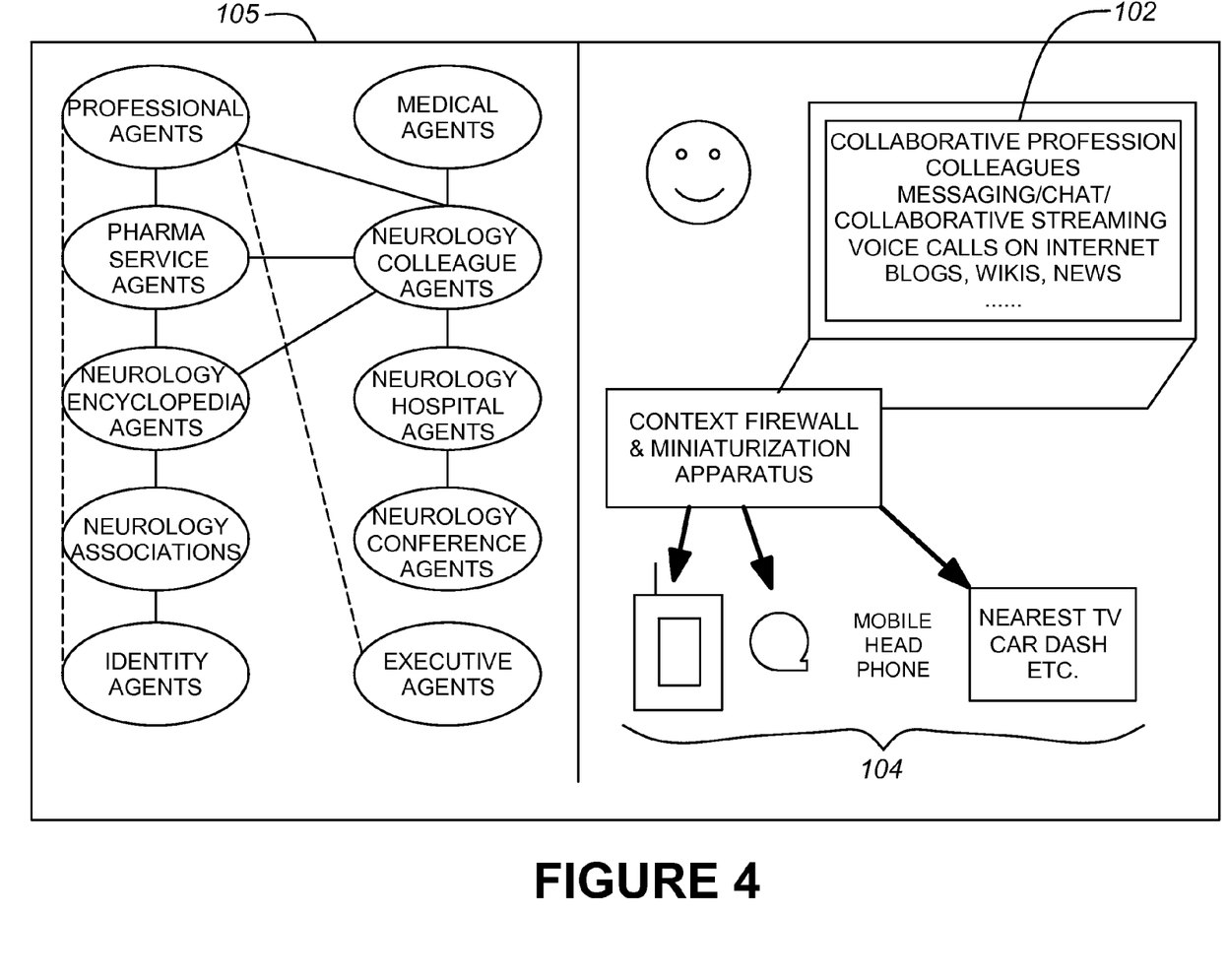
FIG. 4 is a schematic diagram illustrating an exemplary network of professional software agents and showing exemplary patterns of information (i.e. data) flow and services transactions. The right-hand-side illustrates an exemplary physical embodiment of the logical representation illustrated by the left-hand-side, with examples of collaborative services and the devices that such information is delivered on (e.g. the nearest television, car dash, etc.).
Figure 5:
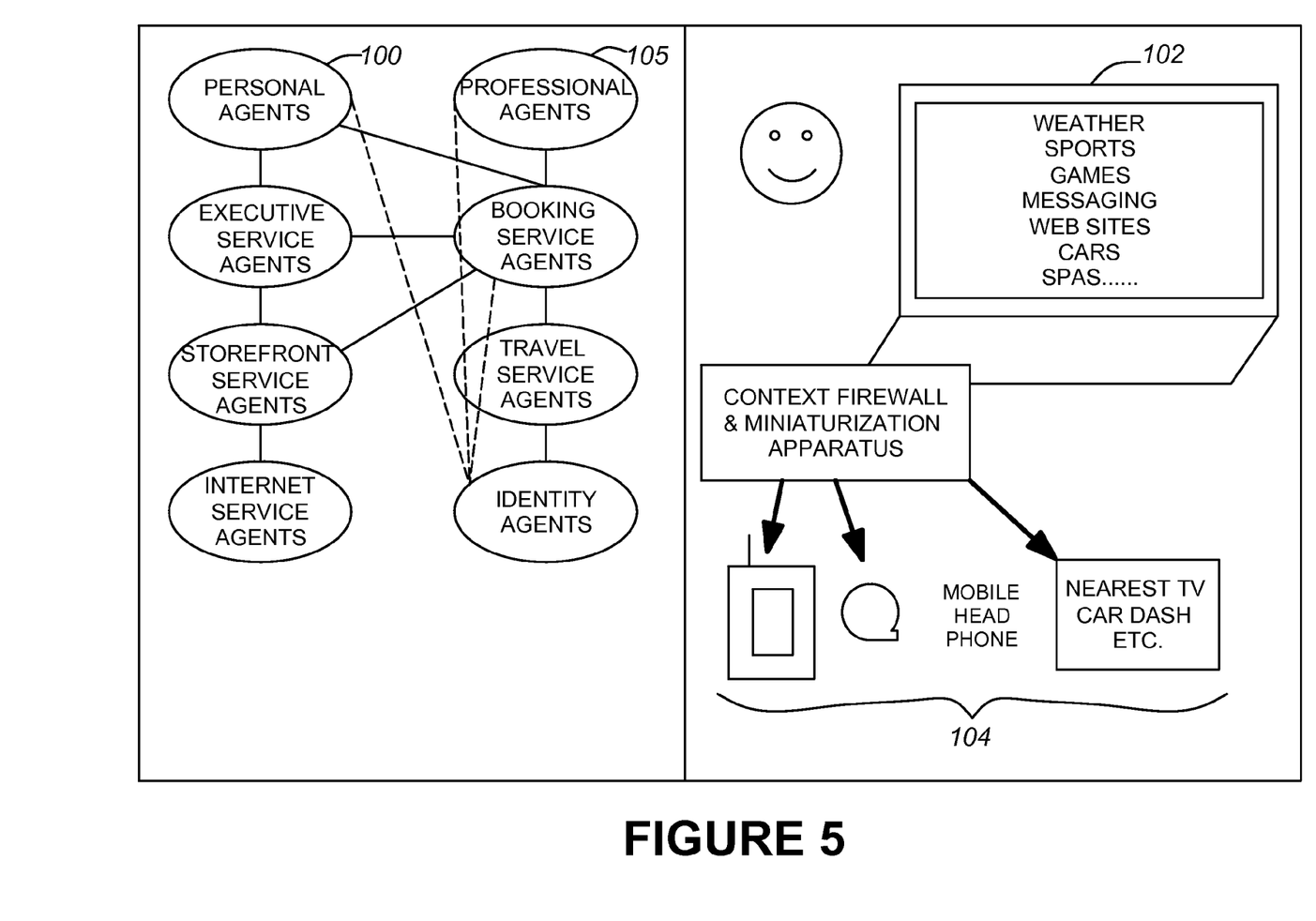
FIG. 5 is a schematic diagram illustrating an exemplary network of collaborative, distributed software agents comprising the personal and professional software agents of FIGS. 3 and 4, and showing exemplary patterns of information flow and services transactions. The right-hand-side illustrates an exemplary physical embodiment of the logical representation of the left-hand-side, with possible collaborative services and the devices that such information is delivered on (e.g. the nearest television, car dash, etc.).

FIGS. 3, 4, 5 and 6 illustrate, on the left-hand-sides thereof, networks of collaborative autonomous agents of the electronic services management system, including personal agents 100 and professional agents 105, and creation agents 110 and destruction agents 120. The right-hand-side areas of those figures illustrate simple, exemplary physical embodiments of the logical representations shown by the left-hand-sides with possible, alternative, devices that may be selected for use for the delivery of that information and/or content. As illustrated by FIG. 3, the types of personal agents 100 are variable and dependent upon the user. They can range from agents for male or female users and may be service agents used to obtain both information and products/goods for the user. They may be established based on the user preferences knowledge information, such as to have the system create a gay service agent. The particular agent types established by the system will drive some of the agent content decisions about the services the agents are to deliver. The agents can offer services to the end user or other agents and positive and negative feedback is given to reinforce and improve agent results as per FIG. 2. Optionally, the collaborative services 102 provided by the agents may select any one or more of different types of devices 104 for receiving the information and services they provide, including desktop, mobile phone, nearest television, car dash, Bluetooth-on-ear, etc. FIG. 4 illustrates an exemplary network of professional agents 105, wherein these particular professional agents serve a medical professional user such as a neurologist. As shown in this figure, different sets of such agents are provided to collaborate and relate with one another to provide services to the professional user in different areas of interest to such user, including services providing pharmaceutical knowledge, neurology knowledge, etc. FIG. 5 illustrates an exemplary network of collaborative, distributed agents comprising the personal and professional agents 100, 105 of FIGS. 3 and 4, and showing exemplary patterns of services transactions and information flow. This example includes executive agents, identity agents, and travel booking agents that would assist both the professional and personal agents in their delivery of content and services to the other agents illustrated in those figures. It is to be noted that all of such agents illustrated in these figures are primary agents, and each such primary agent may have one or more subordinate agents.

Figure 6:
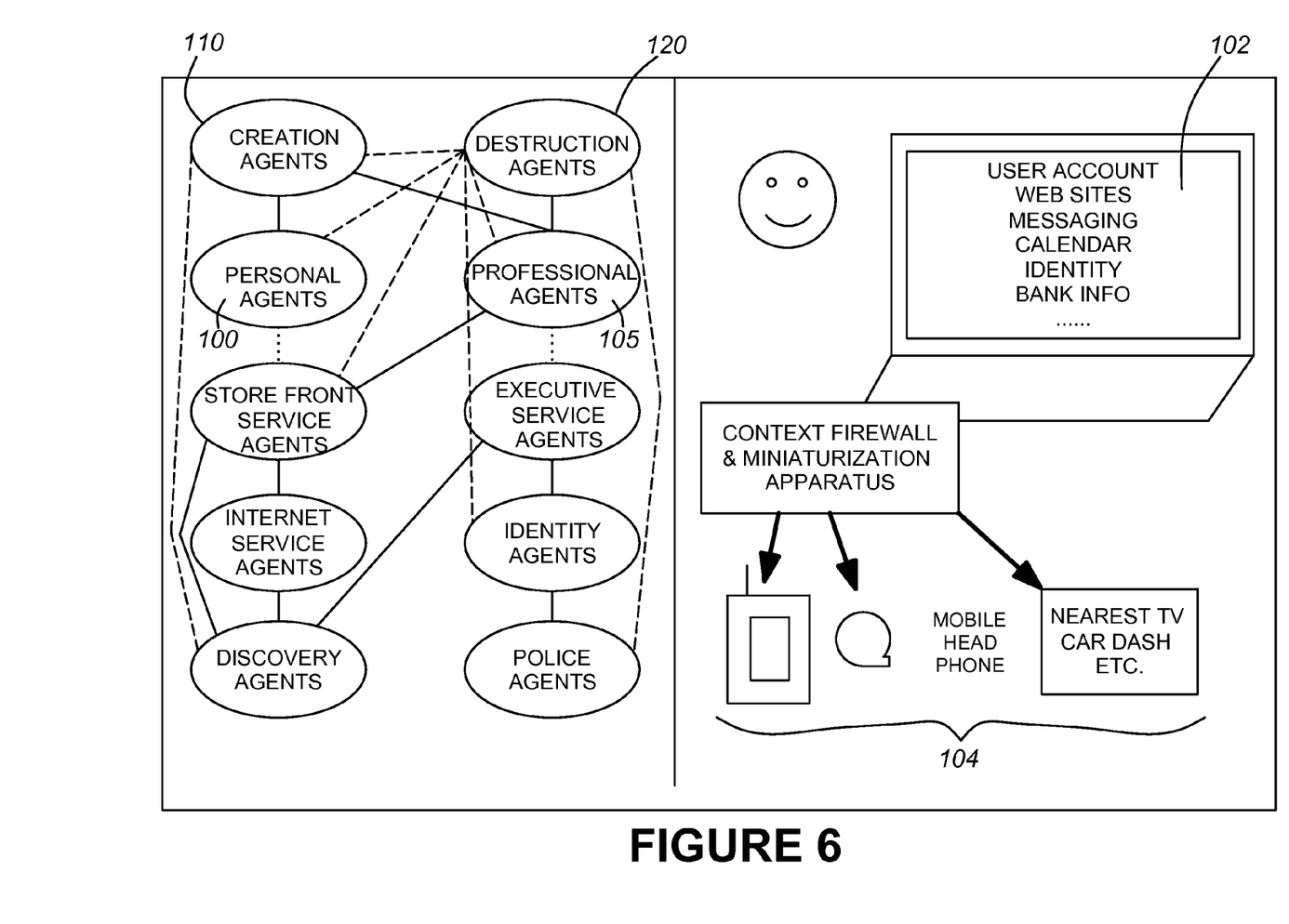
FIG. 6 is a schematic diagram illustrating an exemplary network of collaborative, distributed software service agents comprising creation and destruction service agents, security and policing service agents, and personal and professional agents, and showing exemplary patterns of information flow and services transactions. The right-hand-side is an exemplary physical embodiment of the logical representation with possible devices for delivery of content (e.g. the nearest television, car dash, etc.).

FIG. 6 illustrates an exemplary network of collaborative, distributed agents comprising creation and destruction agents, and security and policing agents, in addition to the personal and professional agents shown in the previous figures. The creation and destruction agents are the root agents of the collaborative agent environment as they have the authority, and are configured to create new agents and to destroy existing ones, respectively. All other agents are subordinates of the creation and destruction agents. Each agent has its own distinctive identifier, namely, an alphanumeric identifier (ID) and this ID is established and assigned by the creation agent when that agent is first spawned by the creation agent.

Figure 7:
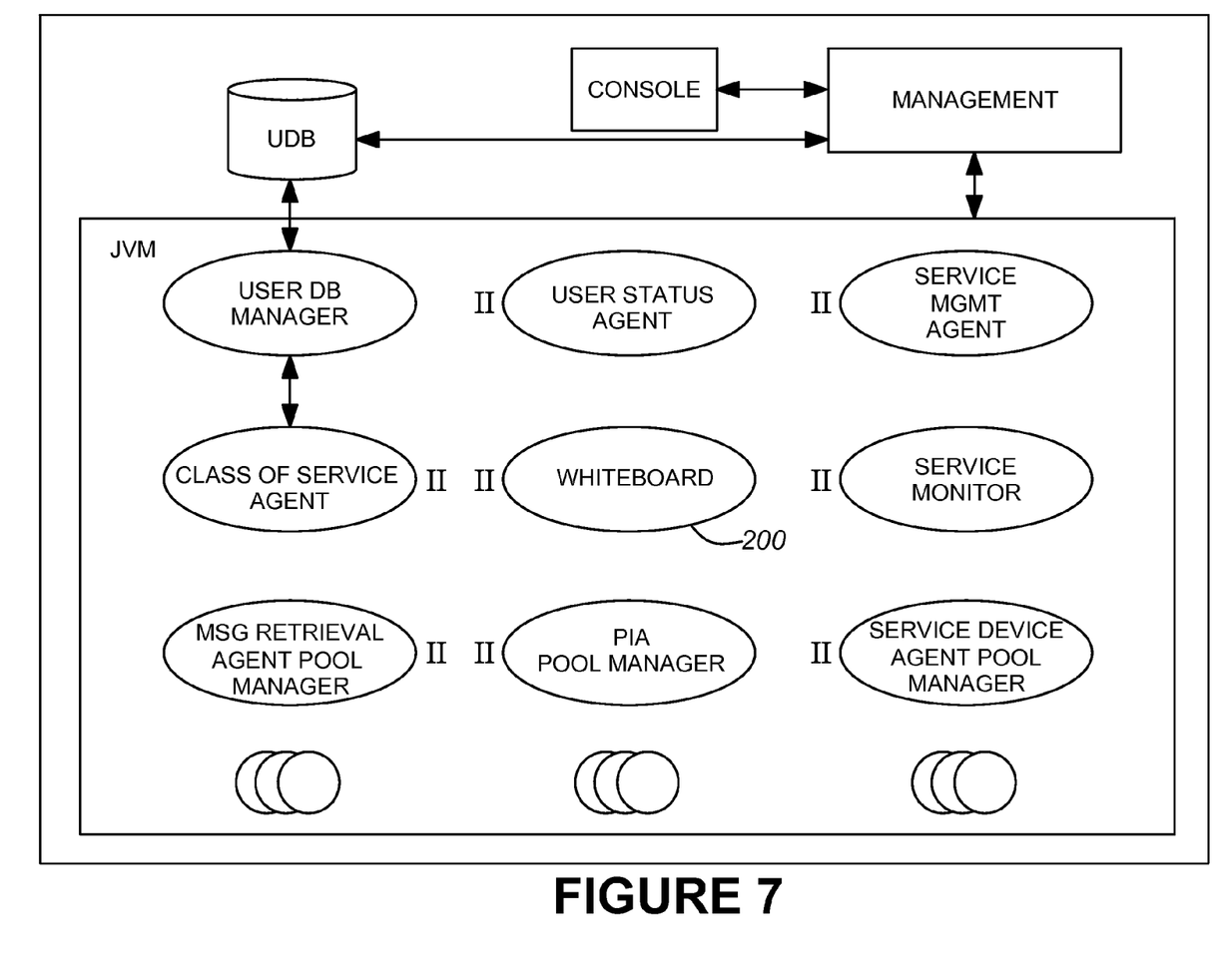
FIG. 7 is a high level block diagram illustrating an overview of some of the main software components which are used by and/or interact with an electronic services management system in accordance with the invention (wherein various of these components is capable of being distributed in a user desktop, a server and/or a user's mobile device, depending upon the desired application).

FIG. 7 illustrates some of the main software components which are used by and/or interact with an electronic services management system. It will be understood by the skilled reader that some of these components may be distributed in a user desktop, a server, a user accessible network and/or a user's mobile device, depending upon choice and the desired application. As shown, the agents in the system make use of a private whiteboard facility 200 to share content and information, to request or bid on services from the other agents and to deliver information to the other agents or to the user on behalf of the other agents. This whiteboard 200 component uses a process of electronic message posting whereby the intended recipient agent(s) then selects from the whiteboard 200 those posted messages, which may include any form of electronic information or facility including resources and/or knowledge, which are addressed or directed to it (them) whereby the recipient(s) is (are) then able to use the information provided by the retrieved message.

The agent structure is configured as a collaboration environment. Included in the system is a bidding component, configured for use by the agents for collaborating through the private whiteboard to obtain a competitive service result for the user e.g. the best price available for a product desired by the user. The bidding component obtains competing service results and provides them to the user for the user's selection. A service result selected by the user is then accepted by the agent on behalf of the user. The bidding component enables a "middleman" i.e. an intermediary agent, to act on behalf of an end user to perform a particular service or task associated with such service. For example, an intermediary agent may gather the best price on a service or product for which an end user wants to know the best price available. This information is first posted to a private whiteboard. If this result is not accepted by the end user, the intermediate agent may request a public whiteboard agent to post a request on a public whiteboard for a best price and then wait for bids from available trusted sources. Trusted sources are typically designated by police agents tasked with browsing the Internet for known fraud schemes and detecting fraud. When bids from trusted sources are posted on the public whiteboard the intermediary agent then takes the best bid to the end user's private whiteboard for dispatch to the end user.

Optionally, the system may provide for multiple users, in which case, depending upon the characteristics of those users, the system may configure itself to provide one or more sets of particular services to a particular set of users. Where this occurs, the system establishes separate private whiteboard facilities, as subordinate whiteboard facilities, for use by one or more of the collaborative agents in providing those particular services to that particular set of users, and a sharing of jobs/tasks amongst those agents is performed on behalf of all such multiple users of that particular set of users. If and when the collaborative agents of the system wish to share or obtain information from a third party source, external to the system, for example a centralized Internet vendor such as Amazon* or eBay* (* third party trademark) which has its own set of collaborative agent services, this is achieved by using a public, rather than a private, whiteboard facility. Such public whiteboard facilities may exist on the Internet and be accessible to agents to initiate or access services transactions and information content.

Collaboration between the software agents is driven through the posting of requests on the whiteboard 200 for tasks that need to be performed. Every time an agent retrieves from the whiteboard 200 a request or task (such as gathering of content, payment for a transaction, deliver a notification to a mobile device, etc.) that it is able to fulfill based on information held or accessible by that agent, the agent adds to the whiteboard 200, in association with that posted request or task, a tag identifying its identification number and that it has taken the matter.

This multi-agent framework uses a range of advanced, adaptive autonomous software agents that can learn new knowledge based on similarity to knowledge they have represented in their embodiment and include intelligent, distributed and mobile agents. Furthermore, agents are configured to learn from a positive or negative reinforcement mechanism based on positive or negative feedback from the user. The positive, or negative, feedback mechanism affects which rules or facts are deleted, or kept in, the knowledge base for reasoning by the user agents through reinforcement values attributed to them which are additive, or subtractive, respectively. The meaning of the term "software agent" will be well-known to the skilled reader. It may, generally, be defined to be a segment of computer software which can be autonomous and/or mobile, is implemented as a component or object, has a state and is able to interact with its environment and to act both pro-actively and reactively. Intelligent agents are autonomous agents that: have specialized knowledge; can learn new knowledge that is similar to, but not the same as, what they know; can communicate with other agents through a whiteboard facility to collaborate on completing tasks; and have a specialty or role in the collaborative agent framework that is considered useful to other agents.

Distributed agents are autonomous agents who have a partial role to fulfill in completing a task. They may physically be embodied in a client device (such as a desktop or mobile phone or car dashboard) or, for example, they may be embodied in a cluster of servers that are on the Internet. Mobile agents are also autonomous agents but they are able to travel through the network, and the Internet or World Wide Web connected to the network, to gather information and content and complete services transactions, depending on the task they are to perform. The mobile agents roam by relocating their execution onto different processors, as needed, as they do so. Not all autonomous agents are mobile; some reside in the client device or server cluster while some others are created to be roaming and mobile. The creation agents can themselves initiate the creation of mobile agents. They may also create mobile agents in response to requests from other agents which need to complete a task or provide a service which requires a mobile agent to roam through the Internet.

Lightweight agents are agents who are intended to operate as thin clients in a device such as a mobile phone requiring relatively little memory and processor (CPU) usage. They are typically operational in a client-server mode whereby substantial (heavy duty) processing takes place on the server while the lesser (lighter) processing takes place in the client and/or lightweight agent. Lightweight agents of the services management system operate in a user's mobile device while some of the adaptive agents operate within the network server, and still others operate as mobile agents to roam through the network, for example, including the Internet and World Wide Web, and obtain information there. As such, the agent architecture is that of a distributed agent network in that different agents are dynamically allocated and executed on distinct processor components located (distributed) throughout the system in such a manner as to achieve effective and convenient usage by, and service to, a user.

The system includes a number of different intelligent agents to act in respect of predefined objectives and complete predefined tasks assigned to them. A primary personal intelligent agent acts as a central controller for the end user and collaborates with the other agents and system components. Similarly, a primary professional intelligent agent acts as a central controller, in co-operation with the primary personal agent, and collaborates with the other agents and system components. Specialist agents are subordinate agents (or "sub-agents") and are configured (i.e. designed) to perform specialized tasks and/or functions for the user, usually indirectly through other agents/sub-agents, such as storefront agents or travel agents. Subordinate agents act on information and can complete services transactions. A subordinate agent may request that a mobile agent be created by the creation agent to complete a transaction such as a financial one and return the result.

As illustrated by FIGS. 3-7, in addition to a primary (main) collaborative personal user agent and a primary (main) professional user agent, the collaborative agents may include sub-categories of these primary agents and each of those may include subordinate agents, including executive agents, storefront agents, booking agents, travel agents, etc., for any given user. All of these agents compete for the personal/professional agent business by means of a system-assigned agent value associated with individual agents through their agent value facility 60, which represents value in terms of parameters that a human user may be expected to value. As such, the behaviour of these competitive, collaborative agents, as a whole, reflects the timely, personal and professional values of the human user.

Each agent includes an agent value facility 60 whereby a self-worth value calculation process is performed, and has assigned to it a numeric value referred to hereinafter as its value coefficient. Initially, the value is assigned based on the importance of that agent in completing a task. A value of 1 implies they are of some importance whereas a value of 10 implies they are of critical importance. As that agent completes more and more tasks, its value coefficient is increased with each such task it is called upon to complete. The destruction agents 120 include in their process of evaluating the agents' worth, a consideration of the agent coefficient value, so this value factors into the decision making process as to whether or not to destroy (terminate) a given agent. If an agent value does not change from the time that was created, for a predetermined period of elapsed time (e.g. 1 month, 3 months or 6 months, depending on how aggressively the system is to be configured for the destruction of agents), then that agent is likely to be destroyed as presenting no additional value unless some other factor to be considered by the destruction agent outweighs such a result.

Agents are configured to compete with one another so as to increase their value to a user. Their value is increased based on the satisfaction of the user. The user's satisfaction is measured based on successful completion of the task by the agent and any positive and negative feedback from the user. User feedback is translated into positive and negative values applied in relation to the agent's value coefficient. As such, an agent which is consistently assigned a negative feedback value from the user will likely establish a sufficiently low or negative value coefficient and, as a result, it will be destroyed by the destruction agent, while an agent consistently assigned positive feedback values will persist. A feedback analysis process (algorithm) is also applied for each agent assigned a user feedback value to determine the nature and cause of the feedback value, and identify what change may be made by the agent in performing the valuated service to improve its service to the user. If and where such a change for improvement is identified, the agent incorporates that change into its processing for that service. For example, if the service performed by the agent was to obtain a purchase price option for the user, and in the result the user rejected such price (service), the analysis process will conduct its own price search to determine whether the price offered by that agent was competitive and, if not, it may be concluded that the cause of the negative feedback was bad pricing. The agent learns from this that its pricing process is to be improved and take steps to do so. Similarly, if the service of the agent involves providing multiple product and price options and, in response, the lowest price or the highest quality product is most often selected by the user with positive feedback regarding the service, it may be concluded that the user's preferred criteria is lowest price or highest quality, respectively. The agent learns from this that it should seek out the lowest price or highest quality, respectively, and modifies its process to do so. This processing for competitive performance, learning and improvement by the agents does not guarantee that they will be permitted to persist, and to the contrary the destruction agent's decisions as to which agents are to be destroyed will be based on agents' relative performance measured against other agents, so the pertinent factor for persistence is relative improvement and not simply improvement per se.

Personal agents 100 have expertise in, and function to service, the personal interests of the human user. By contrast, the professional agents 105 have expertise in, and function to service, the professional interests of the human user. The system provides a predefined generic set of professional agents 105 which, in turn, have specialized professional agent components based on as set of predefined professional sectors, and may include financial, sports, medical, legal, engineering, IT and/or others depending on the particular application and category of user the system is designed for. For each such specialized professional agent, the system provides further sets of sub-specialized professional agent components. Entire agent hierarchies are created and customized based on application requirements and are not limited to those particular exemplary agents shown in the Figures. For example, in the medical profession agents component, there are sub-specialty agents for doctors and nurses, and they are still further segmented, for doctors, into various medical specialties including agents specific to neurologists, radiologists, internists, rheumatologists, cardiologists, etc. and, for nurses, agents that cater to general practitioner nurses, cardiologist nurses, surgical nurses and others. For example, for a user who is a medical doctor with a neurological specialty, the professional agents provided for that user, by the system, cater to and develop networks of collaborative agents for that specialty, including encyclopedic/academic knowledge agents in neurology, agents representing professional associations in neurology, professional networking agents for developing collaborative networks of people that are neurologists, agents specializing in related or adjunct areas such as neurological drugs and/or others.

Agent values, for a personal agent, are representative of the degree of personal interest to the user of the particular agent to which the value is associated. For example, if the user is single, then dating and matchmaking user agents may be assigned a relatively high value at the outset and will either increase or decrease thereafter depending on the real value to the agent that the system observes and learns from the user and the user actions. If the user is gay, for example, then a gay agent may be generated and assigned a relatively high value at the outset. On the other hand, if the user is married, then the particular gender of the user may be a pertinent factor which triggers a number of collaborative agents that cater to a male or female user depending on the user's gender. For example, a system-invoked set of agents for a male user may include stereotypical areas such as sports event agents, betting agents, fast car agents, electronic gadget agents, gaming agents catering to men and men's clothing and accessories agents. All these agents collaborate to gather information and complete services transactions of interest to the end user. For a female user a generated set of agents may include stereotypical agents that cater to female interests such as spa agents, massage agents, aesthetic agents, female sporting events agents, female-type car agents, female gaming agents and women's clothing and accessories agents. Where applicable, gay agents would cater to personal interests of either gay males or gay females based on the user's gender. Further, a gender neutral set of agents are system-invoked to cater to a combination of male and female mutual interests such as family agents, dating agents, dieting agents, sports agents, travel agents, etc. All these agents act on information and complete transactions on behalf of the end user.

Specialist agents, like all of the other autonomous agents, are able to learn user preferences in relation to context. For example, they learn to distinguish and serve the user's personal verses business context and to determine and implement the user's preferences and priorities for family members versus work colleagues. Mobile agents are designed to be secure and to protect the privacy of the user's personal information and/or other confidential information they know of. Encryption is used to protect such information while a mobile agent is in transit. The adaptive, autonomous agents are configured to adapt through machine learning and to distill information based on a predefined or learned relevance.

As stated, an autonomous agent is able to adapt or learn. Some agents learn by comparing the similarity of their existing knowledge that is represented as a set of rules to a new situation which would include a new set of facts and rules. An agent can reason through the new set of rules and draw new inferences if the new facts apply through the generalization of existing facts. For example, if the agent is to perform a service to find an animal that the user would like to purchase, it can check in its current knowledge of the user of what type of animal the user has had as a pet in the past. If it finds that the previous pet was a dog and that a new located animal is a Golden Retriever, which is a type of dog, the agent can infer that the user may like this animal as a pet. However, if the new located animal is a Siamese Cat and the user has never had a cat, it is reasonable to expect that the user would not like that located animal and, in turn, the agent can thus store this new knowledge in its rule base for use by it in future.

Another example concerns adaptive traffic agents configured to map alternate roadway routes when the user encounters a traffic accident while on route (which may or may not be provided in the system depending on the embodiment for a given user). A traffic agent would have a rule base of alternate routes as well as historical routes that the user has tried successfully in the past. The agent would then draw inferences to check if the alternate routes are typically city roadways or other highways. With that learned information, the agent can adapt to suggest to the user the alternate routes that the end user has typically preferred in the past. For example, a user that prefers routes without traffic lights or stop signs and prefers relatively faster (and may be observed, by the system, to have a sporty vehicle) would be guided to highway routes which are typically faster. Conversely, a user, who the system knows does not mind the start/stop of typical city traffic and drives slower routes (even though they may also be known to have a sporty vehicle) could be directed through the slower city route. This can be communicated through in-context relevant devices such as a car dashboard, MP3 player, radio or other device (i.e. by "in-context relevant" it is meant to refer to those devices which are learned by the system, through an assessment of the context of the user, to be most conveniently available to the user and, thus, most relevant to user for the user's context at that time).

Various ones of the foregoing user agents communicate and share relevant information based on collaborative groups and, thereby, also function as collaborative agent groups. For example, a family member agent group may broadcast news about illness or travel of a family member; similarly, a professional agent group may broadcast or share news in a secure manner (e.g. via a secure channel) about company financials or customer issues. The agent framework further segments these collaborative user groups based on interests and age groups through the implementation of closed user sub-groups within the collaborative groups. For example, a collaborative sub-agent group for youth within a group for friends may be formed for a given user, or, instead, a sub-group for seniors.

A given group of collaborative agents, being two or more agents collaborating together to perform or pursue a service for the user, decide on what is relevant, in-context information by sharing the task of determining relevancy with respect to each part of an information message or message portion, or other electronic service item. Each such collaborative group of agents collaborates to learn how to decide what is relevant to a user (the user is not required to explicitly encode a set of rules) by using machine learning algorithms within the agents (and/or by means of learning engines) that calculate probability based on historical examples as well as learning by example with positive and negative feedback to the algorithms based on monitoring user action and agent value.

The relevancy value calculated and associated with an item of electronic information being processed by the system, which could be any of, for example, a received electronic message (e.g. an email), a received RSS feed extract, a blog commentary to be transmitted, a user service in the form of a request for travel arrangements or a financial transaction alert to be responded to, is decided by its content and on the basis of the personal or professional context of the user, whichever applies. A combination of statistical/probabilistic analyses, and learning by example from the user's previous behaviour with respect to received messages and information, are applied by the system to calculate the relevancy value. In some instances, where appropriate, the system also uses a targeted basis for determining relevancy of content based on a user-created intelligent whitelist and blacklist of content subject matter to be targeted. Specifically, the system sets up intelligent whitelists and/or blacklists of subject matter the user may designate in each category for a given user-specified purposed. For example, RSS blog feeds are now so popular that, if permitted to stream to a user unaltered, they would typically contain much content that the user would prefer to have been rejected (blocked-out) and not be received by them. The whitelist and blacklist facility of the system allows the user to identify subject matter which is "always desired" and "never desired" in one or more user-specified RSS feeds, respectively, and, in turn, the system then either forwards and delivers, or blocks, all such feed content identified by it based on a polling process whereby the system periodically reviews and updates its knowledge of the RSS feed for any new content therein since its last review. The system can also learn new rules and facts for the user preferences based on the intelligent whitelists and blacklists.

Content agents 108 are configured for "miniaturization" of the content of information items, whereby "miniaturization" encompasses more than only summarizing or truncating the content. Instead, the content is analysed, it is captured in as minimal a format as possible to convey the essence of its meaning to the user in relation to the user's context (i.e. the user's location, activity and condition at that time), and that meaningful content is condensed into a space format suitable for the user's mobile device that is selected, on the basis of a "most appropriate" criteria, for the user's context.

For example, if the information item being processed by the system is a web page and it is determined that the user is away from the user's desktop, and where the system has determined the item to be of high importance and concludes that it should be forwarded to the user's mobile device (i.e. cell phone) which cannot accommodate a full web page, the system automatically analyses and interprets the key content while deleting content that is superfluous or immaterial to the user in context, such as advertisements, menus and the like. Unlike WAP (wireless access protocols) which depend upon web sites being tagged by their creators for wireless access, the electronic services management system automatically analyses such information for placement in best form on the user's target device.

If the user's in context mobile device is not a limited-display mobile device but, instead, a fully featured wireless laptop, then much of the content is preserved and an urgent notification is delivered to the user within the application the user is currently using on that device. For example, if the user is operating an Excel application, and has determined that a rich-content information item is to be delivered to the user's mobile device based on that user's preferences, history and context, the system delivers an urgent pop-up window, using voice or text (however, if the end user is in a collaborative Internet application such as chat or a web conference, the urgent information is delivered silently, not by voice, so as to preserve the privacy and security of that information) to immediately notify the user that such an item has been forwarded and is available to the user at that device. If the end user is in a context where they are moving, the urgent information can be delivered on a mobile device or the screen of their car based on what the context of the end user is. For example, for such mobile user context, a user agent may decide to push a short video clip to a device such as mobile phone, or mobile video player such as an iPod* (* third party trademark), mapping terminal, car dashboard, or other suitable device.

For personal context determinations, the system identifies a personal group of sources, including family members and friends of the user, and a professional group which includes employers, colleagues, subordinates and executive assistants. To determine context, the system also determines what else is going on around the user. For example, if the user is driving, the system determines what the weather is in the location where the user is driving. This is achieved by the agent sensing the user's remote location through global positioning devices located in a mobile device that is with the user and/or in the car while the user is driving. The executive agent then posts a request on the agent whiteboard 200 for an agent to determine the weather system in the user's locale. A weather agent then picks up that request from the whiteboard 200 and sends a mobile agent to the Weather Network web site to query the route conditions in the user's driving area. The weather agent then communicates through the whiteboard 200 what the weather conditions are. The executive agent is 'listening' for this information i.e. waiting for the occurrence of its posting on the whiteboard and, when this occurs, the executive agent communicates this information to the end user. If the system determines that the weather is bad, then it may decide, based on the user's preferences and history, that information to be forwarded to the mobile user is to be delivered by audio through an MP3 player or a mobile handset or through the user's car radio. By contrast, if the weather is determined to be good, the delivery method determined by the system may be visual such as through a grid in the user's car. In addition, the system ensures that the user's context is respected. If the user is in a privacy-required mode, such as when they are in a collaborative conversation mode, talking to their children or in a meeting, for example, depending upon the user, they will not be disturbed.

Accordingly, only the most relevant content, in context, is delivered wirelessly to the user and it is rendered appropriately to automatically target the capabilities of the particular wireless device. At the same time, based on the user's context determination, the primary personal and professional agents ensure that the various specialized and other subordinate agents, such as storefront agents, who compete for the user's attention, are not given access to the user, or are given access only to the extent that they have determined to be according to the user's preferences, when the user is in that context. This, in effect, provides a virtual context firewall to the user which protects the user from being bombarded by irrelevant information. The professional and personal agents are types of primary agents. They are able to post tasks to the whiteboard 200 for subordinate agents to assist in delivering content for the user. For example, subordinate agents can include travel agents that then post requests to second tier subordinates to provide information about train, bus, airline schedules and costs.

Inter-agent collaboration, comprising both communication and negotiation between agents, is performed directly with the primary personal and professional agents and indirectly for them by subordinate agents with which the primary personal and professional agents contract. For example, a booking agent which is a subordinate to a professional or personal agent, may communicate with other second tier subordinate travel agents for air, train or car rental travel. The booking agent may also post a whiteboard request for service with one or more identity agents, who are its peer agents and are only subordinate to the personal and professional agents. Further, the identity agents may be subject to cash or credit restrictions, such as spending limits, which they must negotiate with financial institutions, such as banks, that are authorized to fund transactions for the primary personal and/or professional agents.

The various foregoing female, male and gay agents represent the primary personal agent and interact with, inter alia, storefront agents that provide access to personal services or contracts for personal services of value to the user, such as services for matchmaking, sporting event ticket purchases, gaming services/casinos, car sales and/or rental services, electronics sales, etc. Depending on the gender of the user, which may determine whether various subordinate agents are generated for male or female interest, the storefront agents will negotiate according to such gender bias with service agents.

New subordinate agents, including subordinates to personal and professional agents, are created by creation agents 110 with the assistance of one or more discovery agents/sub-agents. The creation agents 110 endow knowledge specific to the type of agent (e.g. personal or professional) as well as processes for it to learn, and to calculate values for relevancy and agent valuation decisions. Many personal service agents, such as spa agents, sports agents, travel agents, and the like, are created through more general storefront or Internet agents collaborating on new areas of interest or value to the user based on information they browse, messages received and generated by the user, and direct service requests and resultant purchases made by the user. Some of these are pre-configured and modified/improved for customization to the user over time, as they are used. Discovery agents monitor the user's actions (e.g. service level usage) and periodically review reports on trends obtained from third party services providing such information, to discover new needs and interests of the user and thereby determine possible new services transactions for the user. These are presented to the user, as one or more new optional service agents, once a threshold-level for a relevancy value attributed to them is reached, based on relevancy factors to the user, namely, the user's previous behaviour towards such services or interest areas and monitored statistical trend information directed to that user.

Agents which are no longer of sufficient value are deleted by destruction agents 120. Destruction agents monitor agent value in terms of overall contribution to the collaborative agent network and a sub-class of these agents, referred to as police agents, monitor agents for any signs of corrupt behaviour. For example, if a personal or professional agent or sub-agent is corrupted by a virus, it is immediately valuated to mandate deletion before it corrupts other agents. If a sub-agent attempts to defraud electronic money from a financial, identity or other security-sensitive type of agent, it is deleted. Similarly, if a sub-agent compromises confidential information, such as if it were to try to sell identity agent information without evidence of a transaction, it is also deleted.

The destruction agent also monitors agent activity with respect to the whiteboard and, when an agent is no longer useful it is destroyed. Such non-usefulness of an agent is determined by the destruction agent if and when it finds that such agent is no longer active in using the whiteboard, since this means that it is no longer being called upon to assist in completing tasks through the whiteboard.

Identity agents are important as they share the identity information of the user. To increase the security of the system, the identity information pertaining to the user is distributed over several agents. In this way, no single agent holds all of the user's identity information. More particularly, an addressing personal agent holds the residence information of the user while an addressing professional agent holds the business address of the user. Similarly a personal bank agent holds some of the personal banking information of the user while a professional bank agent holds business banking information of the user. Most importantly, no one agent holds all of the user's credit card, social security number, banking, and other confidential financial information; instead, these items of information are distributed over multiple agents and each such agent is required to negotiate or collaborate with the other agent(s), and/or vouch for another agent's status or information, in order to expand their stock of identity and/or financial information, or share their information, so as to ensure that this information does not fall into corrupt agent memory. Furthermore, the policing agents monitor the agent for hoarding or not deleting personal identity information that they gather and can call for the destruction of agents that hoard more than two personal identity identifiers. A primary identity creation agent creates a sub-agent on behalf of the main identity agent and that creation agent holds all master agent information for each such sub-agent, including all identity agents'/sub-agents' rights and encryption keys. Identity agents and sub-agents are also closely monitored by the destruction agents to ensure that they do not get corrupted or violate their contracts with the personal or professional agents.

Communication between identity agents is performed in like manner to communication with all other agents, namely, by means of the private whiteboard component 200, as shown in FIG. 7. Advantageously, this architecture allows for greater autonomy by each such agent using the whiteboard 200 and, because paths of communication between agents is indirect, it makes it more difficult for any unauthorized party (e.g. a corrupted agent) to trace those communications for unintended/unauthorized purposes. The private whiteboard 200 is used by these agents in the following manner, which sets out an exemplary financial transaction performed by multiple identify agents on behalf of the user. In this example, three identity agents, all being sub-agents of a primary (main) identity agent, are used and required in order to complete a credit card payment transaction for the user, such as to complete payment of an item purchased by another agent (e.g. a storefront agent).

- ID Sub-agent 1—has a payment transaction it seeks to perform for the user and posts to whiteboard 200 a message comprising a request to pay a specified amount, and receives the encryption key required to use identity information needed to pay the amount and also requires, from the main creation agent for the identity agents, verification of the integrity of the agents which provided the that encrypted information.
- ID Sub-agent 2—holds some of the required identify information concerning the user that is needed to pay the amount per Agent 1's request, this agent receives Agent 1's request from the whiteboard and, in response, encrypts the required identify information it holds and forwards it to the whiteboard.
- ID Sub-agent 3—holds some of the required identify information concerning the user that is needed to pay the amount per Agent 1's request, this agent receives Agent 1's request from the whiteboard and, in response, encrypts the required identify information it holds and forwards it to the whiteboard.
- ID Sub-agent 4—acts as a keymaster, holding encryption keys for other sub-agents, and provides to sub-agent 1 the encryption keys of sub-agents 3 and 4 to use the identity information required to pay the amount for the transaction.

Accordingly, these security steps provide security to usages of identity information by requiring that two distinct security layers be complied with: firstly, any agent wanting to use such information must be able to be successful in obtaining access to the information so as to be able to comprehend/use it (i.e. how to comprehend the information needed?); and secondly, that agent must obtain verification of the rights of the agents from whom the information is obtained (i.e. have the right agents provided the information?).

A primary (main) police agent monitors (by polling) the activities occurring through the private whiteboard 200 and receives reports from multiple police sub-agents. The police agents and sub-agents have information regarding the transaction processes the identity agents and sub-agents are required to follow. They also monitor the activities on the private whiteboard and actions of the identity agents and sub-agents, and report to the primary police agent any action taken by an identity agent/sub-agent which is not within that's agent's/sub-agent's rights and anything posted onto the whiteboard by an agent/sub-agent which is not permitted by that agent/sub-agent or is otherwise non-conforming with expected actions (such as duplicative or redundant postings). The police agents/sub-agents also regularly evaluate the security of the creation agent and any sub-agents by monitoring for unusual behaviour by the creation agent/sub-agents in their dealings with other agents/sub-agent and by randomly imposing predefined tests on the creation agent/sub-agent. The security of the police agents/sub-agents, themselves, is monitored by means of duplication as between process performed by different police agents/sub-agents and then testing different results or actions taken by different police agents/sub-agents by means of a voting process amongst all police agents/sub-agents or all within pre-determined categories. This type of voting process, for authentication and security purposes is common and well-known in this technical area, with a minimum of three voting agents typically being used.

It is to be noted that the foregoing whiteboard 200 is for private use on behalf of the user only and is not shared to outside agents. For purposes of such outside sharing, another whiteboard is used and is referred to as a public or multi-user whiteboard. Such public whiteboard facilities may be located at remote servers or terminals used by public service providers (e.g. provided by eBay or similar third party service). Private whiteboard police agents may have subordinate policing agents monitor public whiteboards to ensure identity information is not compromised or put on public auction (e.g. end user credit card numbers for sale).

Some or all of the foregoing agents and other components of the subject services management system can be distributed overthe user's desktop, the server and/or the user's mobile device to provide a number of advantages, depending upon the application and it is not intended to limit the invention claimed herein to any one set-up.

It is to be understood that the specific system components and objects described herein are not intended to limit the invention which, from the teachings provided herein, could be implemented and embodied in any number of alternative computer program embodiments by persons skilled in the art. Rather the invention is defined by the appended claims.

What is claimed is:

1. A computer implemented electronic services management system for a mobile communications network, said system embodied on at least one memory and executed by at least one processor, said system comprising a distributed network of agents in the form of collaborative autonomous software agents, said agents being configured to represent and act on behalf of a user wherein said agents communicate with each other to manage for said user one or more electronic services comprising one or more of electronic messages, services, and requests, wherein one or more communications devices of said user receives, forwards, or generates said electronic services, said agents comprising multiple types of agents comprising at least one primary personal agent, a primary creation agent configured for creating others of said agents including one or more subordinate agents and a primary destruction agent configured for destroying an agent meeting pre-determined criteria comprising a threshold value in relation to an agent value coefficient, said agents being configured for collaboration together using a private user whiteboard facility whereby collaborating agents post addressed electronic services, including service tasks to be performed for said user, to said whiteboard and extract electronic services from said whiteboard which are addressed to them, to share content and information, to request services from the other agents, to receive services from the other agents, and to deliver services to the other agents or to said user.

2. The computer implemented electronic services management system according to claim 1 wherein said creation agents endow to each type of agent knowledge specific to that type of agent and processes for that type of agent to perform, to learn, and to make valuation decisions.

3. The computer implemented electronic services management system according to claim 1 and further comprising discovery agents configured for monitoring said user's actions for service level usage, for reviewing third party information useful for identifying new needs or interests of said user and for determining a prospective new service for said user, wherein said prospective new service is presented to said user as one or more prospective new service agents once a predetermined threshold level for a relevancy value attributed to said prospective new service agent(s) is reached based on relevancy factors to said user.

4. The computer implemented electronic services management system according to claim 1 and further comprising a primary professional agent, wherein each said personal and professional agent comprises an agent value facility for determining said agent value coefficient whereby a value calculation process is performed to assign to that agent a numeric value based on the importance of that agent in completing a task, said value coefficient being increased with each such task said agent is called upon to complete.

5. The computer implemented electronic services management system according to claim 4 wherein said primary personal agent is an intelligent agent acting as a central controller for said user and collaborating with the other agents and components of said system, and said primary professional agent is an intelligent agent acting cooperatively with said primary personal agent as said central controller and collaborating with the other agents and components of said system; and further comprising a plurality of specialist, subordinate agents configured to perform specialized tasks or functions for said user.

6. The computer implemented electronic services management system according to claim 4 wherein each said agent operates collaboratively with one or more others of said agents in providing a service for said user and said agent value coefficient is further based on that agent's contribution to said collaborative agent network.

7. The computer implemented electronic services management system according to claim 6 wherein inter-agent collaboration comprises communication and negotiation between agents, and is performed directly with said primary personal and professional agents and indirectly for said primary personal and professional agents by subordinate agents with which said primary personal and professional agents communicate and negotiate.

8. The computer implemented electronic services management system according to claim 6 wherein said system comprises a user/agent feedback facility configured for providing feedback to said system in respect of services provided by one said agent to said user or to another said agent acting for said user, said user/agent feedback represented by positive or negative values applied in relation to said value coefficient of said one agent which provided said services.

9. The computer implemented electronic services management system according to claim 8 wherein said user/agent feedback facility is configured to perform feedback analysis for an agent assigned a user/agent feedback value, to determine the nature and cause of such feedback value and to identify and implement a change that may be made by that agent in performing a valuated service to improve that agent's service to said user/agent.

10. The computer implemented electronic services management system according to claim 6 wherein said agents are configured to collaborate to learn how to decide what is relevant to said user, whereby a relevancy value is calculated and associated with an item of electronic information being processed by the system based on content or the personal or professional context of said user.

11. The computer implemented electronic services management system according to claim 6, and further comprising a bidding component configured for use by said agents for collaborating through said private whiteboard to obtain competing service results, to provide said competing service results to said user for said user's selection and to accept on behalf of said user a user-selected service result, for acting on behalf of said user to obtain a competitive service result for said user.

12. The computer implemented electronic services management system according to claim 4 and further comprising specialized subordinate professional agents having expertise in, and configured for providing user services pertaining to, specialized professional interests of said user.

13. The computer implemented electronic services management system according to claim 4 wherein said personal and professional agents compete to provide services to said user and said agent value facility is configured to cause said agent value coefficient to represent said agent's relative performance measured against other agents.

14. The computer implemented electronic services management system according to claim 1 and further comprising a primary identity agent and one or more subordinate identity agents configured to share identity information personal to said user wherein said identity information is distributed over a plurality of said identity agents whereby no single identity agent holds all of said user's identity information, and said destruction agents monitor said identity agents for activities indicating corruption or violating terms of contracts between said identity agents and other said agents.

15. The computer implemented electronic services management system according to claim 14 wherein each said identity agent is created by a creation agent which maintains security information pertaining to said identity agent including said identity agent's required processes or said identity agent's rights or said identity agent's encryption keys.

16. The computer implemented electronic services management system according to claim 14 wherein said network of agents includes one or more mobile agents configured to protect said user's personal identity information while said mobile agent is in transit using encryption.

17. The computer implemented electronic services management system according to claim 14 configured to apply two distinct agent security layers to an agent seeking to access and use personal identity information, including verifying said agent's right to access and use said personal identity information and verifying said personal identity information's source's right to make such access and use available to said agent.

18. The computer implemented electronic services management system according to claim 1 and further comprising a primary police agent and one or more subordinate police agents, wherein said police agents are subordinate to said destruction agents and monitor agents' activities performed using said private whiteboard and report any process step taken by one or more agents which is not permitted by said agent(s) or is otherwise non-conforming with pre-determined permitted processes of said agent(s).

19. The computer implemented electronic services management system according to claim 1 wherein each said agent has a sensing engine configured to accept and analyse electronic services input to the system, a reasoning engine configured to receive said input services from said sensing engine and combine said input services with knowledge obtained from other input services or knowledge obtained from a knowledge base of rules and facts, a learning engine configured to compare said input services to existing knowledge in said knowledge base and to add said input services to said knowledge base if it is not already contained in said knowledge base, and a communication engine configured to output electronic services from said agent and input electronic services to said agent.

* * * * *